US007460351B2

(12) United States Patent
Wei et al.

(10) Patent No.: US 7,460,351 B2
(45) Date of Patent: Dec. 2, 2008

(54) ELECTRICAL CONNECTION BOX

(75) Inventors: Yonggang Wei, Shenzhen (CN); Siyong Yang, Shenzhen (CN)

(73) Assignees: CE Lighting Ltd., Shenzhen (CN); Landlite Light Fixtures Mfg. Co., Ltd., Shenzhen (CN); Landlite Lighting Mfg. Co., Ltd., Shenzhen (CN)

( * ) Notice: Subject to any disclaimer, the term of this patent is extended or adjusted under 35 U.S.C. 154(b) by 511 days.

(21) Appl. No.: 11/212,316

(22) Filed: Aug. 26, 2005

(65) Prior Publication Data

US 2006/0187619 A1 Aug. 24, 2006

(30) Foreign Application Priority Data

Feb. 20, 2005 (CN) .................... 2005 2 0007221 U

(51) Int. Cl.
*H02H 5/04* (2006.01)
*H02H 9/00* (2006.01)

(52) U.S. Cl. ........................................ 361/103; 361/56

(58) Field of Classification Search .................. 361/103
See application file for complete search history.

(56) References Cited

U.S. PATENT DOCUMENTS 4,638,133 A * 1/1987 Dvorak et al. ............ 200/302.1
5,276,582 A * 1/1994 Merrill et al. ............... 361/111
5,278,432 A * 1/1994 Ignatius et al. ................ 257/88
5,729,925 A * 3/1998 Prothero ....................... 40/570
6,441,637 B1 * 8/2002 Neeb .......................... 324/771
6,650,064 B2 * 11/2003 Guthrie et al. .......... 315/185 R

* cited by examiner

*Primary Examiner*—Stephen W Jackson
*Assistant Examiner*—Scott Bauer
(74) *Attorney, Agent, or Firm*—Hamre, Schumann, Mueller & Larson, P.C.

(57) ABSTRACT

An electrical connection box comprises a base cover (1) having a plurality of first openings in both sides thereof; a top cover (8) having a plurality of second openings in both sides thereof; a main PCB board (3); an input DC socket (4) located on said PCB board; a plurality of output DC sockets (5) located on said PCB board; a plurality of short circuit protectors (6) located on said PCB board, each said protector connecting each said output DC socket in parallel; a thermal protector (7) located on said PCB board; and a heat transmitter (2) covering on said input DC socket, output DC sockets, short circuit protectors and thermal protector; wherein said heat transmitter concentratively transfers the heat of said input DC socket, output DC sockets, short circuit protectors to said thermal protector; and wherein said main PCB board, input DC socket, output DC sockets, short circuit protectors and thermal protector are arranged between said base cover and top cover.

17 Claims, 2 Drawing Sheets

ELECTRICAL CONNECTION BOX

BACKGROUND OF THE INVENTION

1. Field of the Invention

The present invention relates to an electrical connection box, and especially to an electrical connection box having protective features within its internal construction to provide safety and efficiency towards the operation of LED's (Light Emitting Diodes) connected to it.

2. Description of the Prior Art

It is well-known that current connection boxes have simple function of connection. Once a short circuit situation has occurred or the circuit temperature rises over the set protective limit, the circuit will be blocked off and the LED's will be burnt out. Although a fuse may be added in certain type of connection box, once the fuse has blown, the connection box becomes broken.

Thus, an improved electrical connection box which overcomes the above-mentioned problems is desired.

BRIEF SUMMARY OF THE INVENTION

A primary object of the present invention is to provide an electrical connection box having protective function of offering safety and efficiency towards the operation of LED's connected to it.

To achieve the above-mentioned object, an electrical connection box in accordance with a preferred embodiment of the present invention is disclosed. The electrical connection box comprises a base cover having a plurality of first openings in both sides thereof; a top cover having a plurality of second openings in both sides thereof; a main PCB board; an input DC socket located on said PCB board; a plurality of output DC sockets located on said PCB board; a plurality of short circuit protectors located on said PCB board, each said protector connecting each said output DC socket in parallel; a thermal protector located on said PCB board; and a heat transmitter covering on said input DC socket, output DC sockets, short circuit protectors and thermal protector; wherein said heat transmitter concentratively transfers the heat of said input DC socket, output DC sockets, short circuit protectors to said thermal protector; and wherein said main PCB board, input DC socket, output DC sockets, short circuit protectors and thermal protector are arranged between said base cover and top cover. The present invention also provides a short circuit protector arranged in the electrical connection box comprising a triode; and a constant voltage diode; wherein the anode of said constant voltage diode connects with the collector of said triode and the cathode of said constant voltage diode connects with the base of the triode.

In accordance with the present invention, every series-connected socket has paralleled short-circuit protection. Once an LED short-circuit situation has occurred, individual short-circuit protection will activate and isolate the faulty LED fitting, but maintain the proper operation of the rest of the fittings connected to the electrical connection box. As soon as the cause of any short circuit has ceased, the short circuit protection will end and normal operation of the circuit resume. The electrical connection box also has a thermal protector connected across the whole circuit. If the electrical connection box circuit temperature rises over the set protective limit, this thermal protector will automatically cut off the whole power to all output circuits. When the temperature returns to a safe temperature, the power is automatically resumed to all outputs again.

Other objects, advantages and novel features of the present invention will become more apparent from the following detailed description when taken in conjunction with the accompanying drawings, in which:

DETAILED DESCRIPTION OF THE INVENTION

Figure 1:
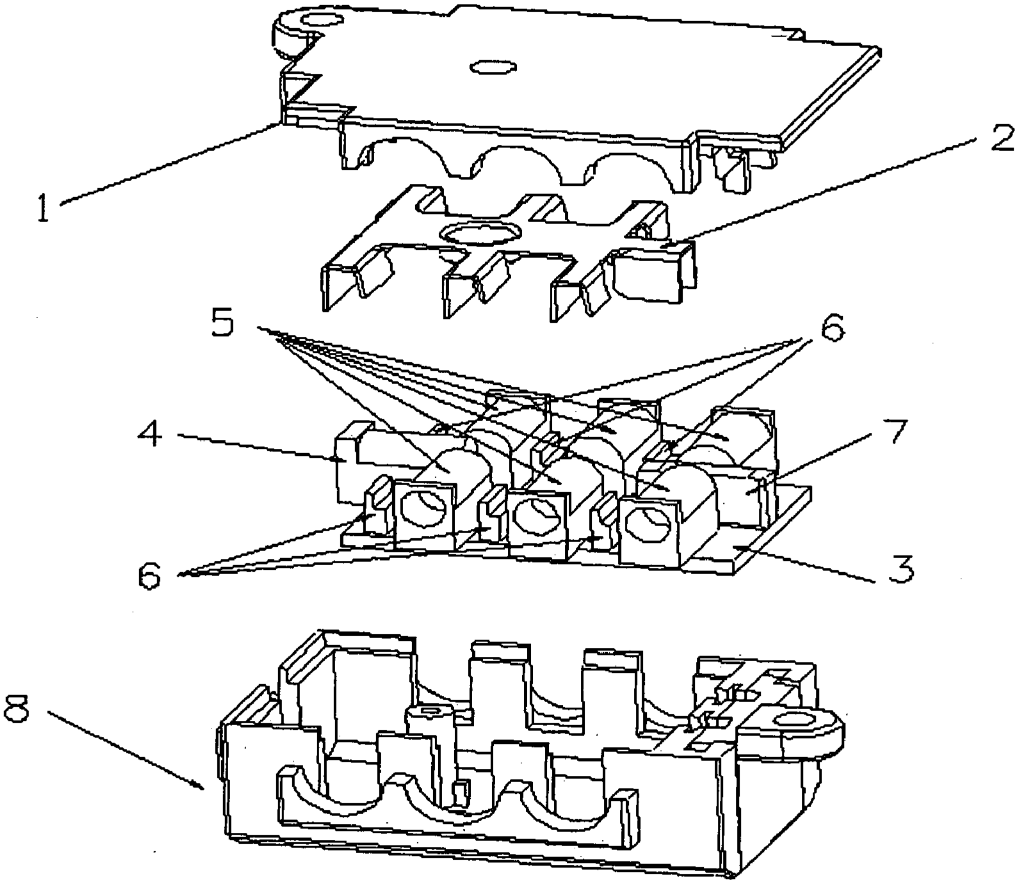
FIG. 1 is an exploded perspective view of an electrical connection box in accordance with the present invention.

Referring to FIG. 1, an electrical connection box in accordance with a preferred embodiment of the present invention includes a base cover 1, a heat transmitter 2, a main PCB board 3, an input DC socket 4, a plurality of output DC sockets 5, a plurality of short circuit protectors 6, a thermal protector 7 and a top cover 8.

Figure 2:
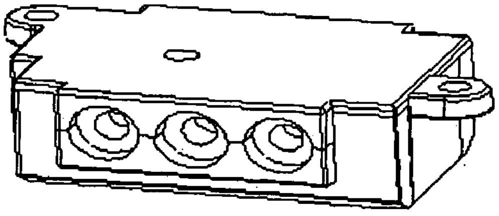
FIG. 2 is a perspective view of the electrical connection box when assembled.

The input DC socket 4, output DC sockets 5, short circuit protectors 6, and the thermal protector 7 are soldered on the main PCB board 3 by soldering-tin. The input DC socket 4 is located on one end of the PCB board 3. In the preferred embodiment there are six output DC sockets 5. Three of these output DC sockets 5 are arranged along one side of the PCB board 3 and the other three sockets 5 are arranged along the other side of the PCB board 3. These output DC sockets 5 are connected each other in series. Each output DC socket 5 connects an LED load unit (see FIGS. 3-4). Each short circuit protector 6 is adjacent to and connected to each output DC socket 5 in parallel, respectively. With respect to the construction and function of the short circuit protectors 6, a detailed description will be provided in the following text. The thermal protector 7 is located on the other end of the PCB board 3 corresponding to the input DC socket 4. The heat transmitter 2 covers on the input DC socket 4, output DC sockets 5, short circuit protectors 6 and the thermal protector 7, and concentratively transfers the heat of the input DC socket 4, output DC sockets 5, short circuit protectors 6 to the thermal protector 7. If the temperature rises over the set protective limit, this thermal protector 7 will automatically cut off the whole power to all output circuits. When the temperature returns to a safe level, the power is automatically resumed to all output circuits. Each side of the base cover 1 and top cover 8 forms three semicircular openings. When assembled, two opposite semicircular openings of the base cover 1 and top cover 8 form a circular opening of which the position and the size is corresponding to a jack of one output DC socket 6. The assembled electrical connection box is shown on FIG. 2.

Figure 3:
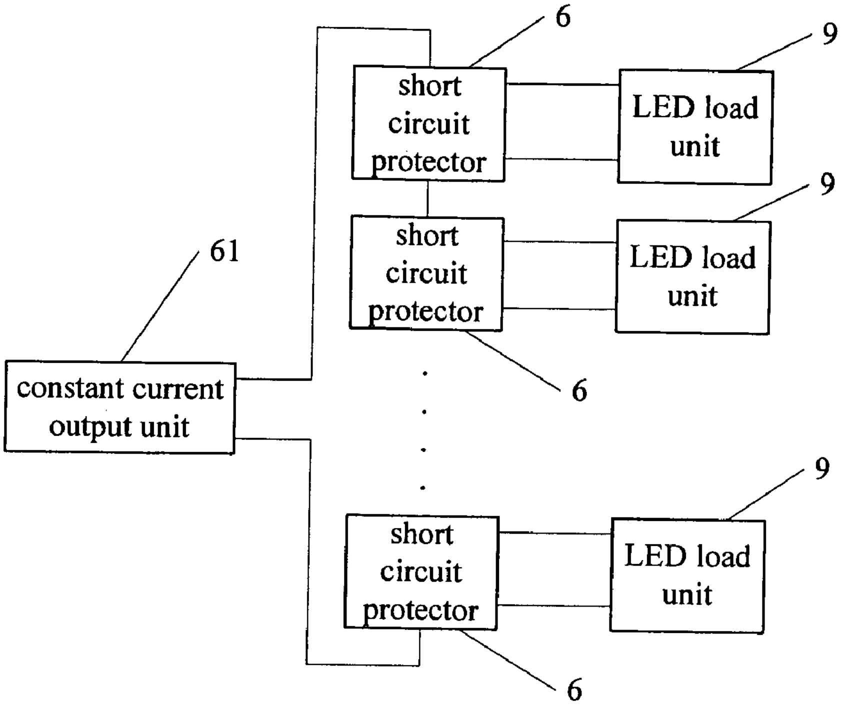
FIG. 3 is a frame view of the short circuit protector of the electrical connection box in accordance with the present invention.

Referring to FIG. 3, each short circuit protector 6 connects an LED load unit 9 in parallel and every pair of paralleled short circuit protector 6 and LED load unit 9 connects together in series. A constant current output unit 61 serves as an output of the short circuit protector 6. Generally, when certain LED load unit 9 is in the open circuit situation or its internal resistance increases, the protector 6 connected thereto could short-circuit the faulty LED load unit 9, thereby insuring other LED load units 9 and the constant current output unit 61 to work properly. After changed the faulty LED load unit 9, this protector 6 turns off the function of short circuit automatically and then switches on the changed LED load unit 9.

Figure 4:
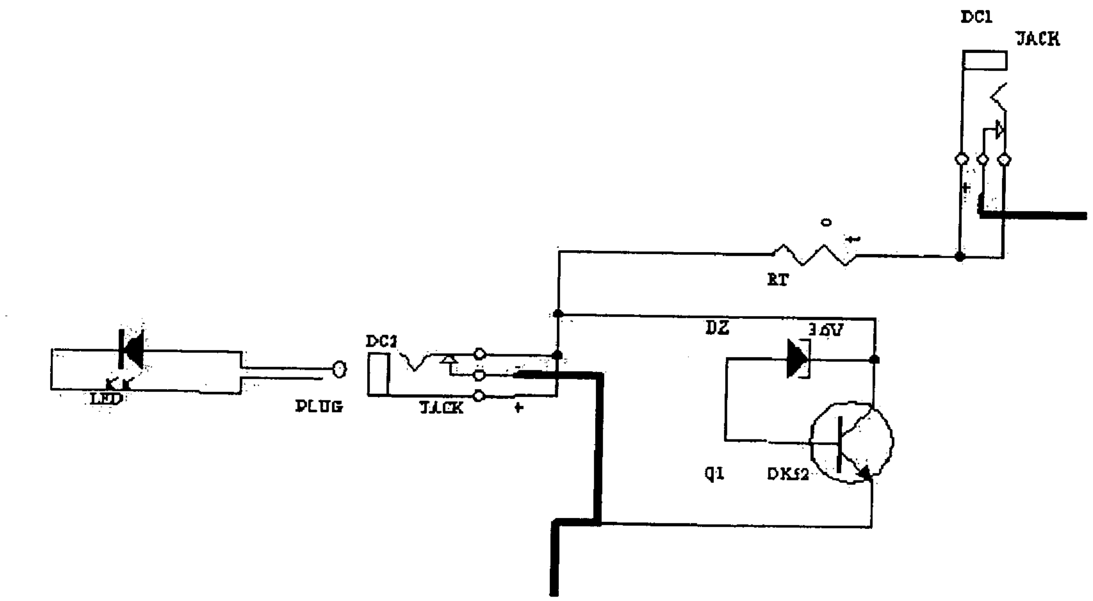
FIG. 4 is a circuit connection view showing protective function in accordance with the present invention.

Then referring to FIG. 4, a detailed circuit connection in respect of FIG. 3 is disclosed. In the preferred embodiment, when the LED load unit 9 is on, the output DC socket 5 connected thereto switches off, and when the LED load unit 9 is off, the output DC socket 5 connected thereto switches on to short-circuit the protector 6. The short circuit protector 6 includes a constant voltage diode DZ and a triode Q1, wherein the anode of the constant voltage diode DZ connects with the collector of the triode Q1 and the cathode of the constant voltage diode DZ connects with the base of the triode Q1. The short circuit protector 6 connects the constant current output unit 61 via a self-recovery temperature resistance $R_T$.

In general, the constant current output unit 61 has a maximum output voltage $V_{OUTMAX}$, while the rated voltage of the LED load unit 9 which we use $V_{LOADMAX}$ is not excess of the maximum output voltage $V_{OUTMAX}$, that is $V_{LOADMAX} < V_{OUTMAX}$.

When an LED load unit 9 works in a normal state, the voltage thereof is between 3~3.7V, while the voltage of the constant voltage diode DZ is 3.6V plus 0.6V of the on voltage of the base of the triode Q1. As a result, the on voltage of the constant voltage diode DZ is over 4.2V. In other words, no current passes the base of the triode Q1, that is, the triode Q1 turns off.

Provided that $V_{OUTMAX}$ is 40V and the rated voltage of each LED load unit 9 is 3.5V, the total load voltage $V_{LOAD}$ is 21V (3.5*6=21), here $V_{LOAD}$ is less than $V_{OUTMAX}$. When an LED load unit 9 is broken and under an open circuit state, the output current will decrease to zero abruptly, while the output voltage of the constant current output unit 61 (namely the voltage of the short circuit protector 6) will increase rapidly from 3.5V. During the course of this voltage increasing, when it reaches over 4.2V (3.6V plus 0.6V), the constant voltage diode DZ will be activated and then the triode Q1 will also be activated for the reason of the current passing through the base thereof. This current flow by the triode Q1 and self-recovery temperature resistance $R_T$, which makes the LED load unit 9 and the constant current output unit 61 a loop to keep on conducting. Here the temperature of the triode Q1 will rise gradually. Once this temperature is over a rated value of the self-recovery temperature resistance $R_T$, the circuit will turn off and the temperature will drop subsequently. As soon as the temperature is less than the rated value of the self-recovery temperature resistance $R_T$, the circuit will turn on accordingly. In this case, the normal LED load units 9 will be sometimes on and sometime off, so as to remind users to change the broken LED load unit 9.

When an LED load unit 9 is broken and its internal resistance increase, the current of the constant current output unit 61 keeps constant. So the voltage of the LED load unit 9 $V_{LED}$ increases too. When it is over 4.2V, as stated in aforesaid paragraph, the triode Q1 will be activated. Here the current will pass through the triode Q1 and the LED load unit 9.

When an LED load unit 9 is broken and under a short circuit state, the current goes through the LED load unit 9 directly. There is not any adverse effect on other LED load units 9 and the constant current output unit 61.

When changing an LED load unit 9, the output DC socket 5 connected thereto will switch on to short-circuit the protector 6 if taking off this LED load unit 9. The temperature of the circuit drops therewith. When a changed LED load unit 9 is on, the output DC socket 5 connected thereto returns to switch off. Because there is a little dithering when replacing the LED load unit 9, here the voltage of the LED load unit 9 is 3.5V and that of the constant voltage diode DZ is 4.2V, the triode Q1 is not be activated. Thus, it does not require cut off the power when changing the LED load unit 9. The operation is also simple and convenient.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electrical connection box comprising:

a base cover having a plurality of first openings;

a top cover having a plurality of second openings, each of which is configured to connect to a corresponding first opening to form an outside jack for an output DC socket and thereby form a plurality of jacks;

a main PCB board;

an input DC socket located on said PCB board;

a plurality of output DC sockets located on said PCB board, each of the output DC sockets corresponding to one of the jacks;

a plurality of short circuit protectors located on said PCB board, each said short circuit protector being connected to each said output DC socket in parallel, each said short circuit protector comprising a triode having a collector and a base, and a constant voltage diode having an anode and a cathode, wherein the anode of the constant voltage diode is connected to the collector of the triode, and the cathode of the constant voltage diode is connected to the base of the triode;

a thermal protector located on said PCB board; and a heat transmitter being configured to cover said input DC socket, output DC sockets, short circuit protectors and thermal protector;

wherein said heat transmitter being configured to concentratively transfer heat of said input DC socket, output DC sockets, short circuit protectors to said thermal protector, said thermal protector being configured to cut off or resume power to all output circuits according to temperature change of the thermal protector in response to the heat transferred thereto via the heat transmitter; and wherein said main PCB board, input DC socket, output DC sockets, short circuit protectors and thermal protector are arranged between said base cover and top cover.

2. The electrical connection box as claimed in claim 1, wherein said input DC socket is located on one end of said PCB board.

3. The electrical connection box as claimed in claim 1, wherein said output DC sockets are connected each other in series.

4. The electrical connection box as claimed in claim 1, wherein each said output DC socket connects an LED load unit.

5. The electrical connection box as claimed in claim 1, wherein said thermal protector is located on the other end of said PCB board corresponding to said input DC socket.

6. A short circuit protector ranged in said electrical connection box as claimed in claim 1 comprising:

a triode; and a constant voltage diode;

wherein said short circuit protector being configured to be connected to a constant current output unit via a self-recovery temperature resistance, the self-recovery temperature resistance is configured to turn off or turn on a circuit between one of the short circuit protectors and the constant current output unit according to temperature change of the triode.

7. The short circuit protector as claimed in 6, wherein each said short circuit protector connects an LED load unit in parallel and every pair of paralleled short circuit protector and LED load unit connects together in series.

8. An electrical connection box comprising:

a housing defining a plurality of openings, each of which forms an outside jack for an output DC socket;

a PCB assembly arranged in said housing including a main PCB board, an input DC socket, a plurality of output DC sockets, a plurality of short circuit protectors and a thermal protector, each said short circuit protector comprising a triode having a collector and a base, and a constant voltage diode having an anode and a cathode, wherein the anode of the constant voltage diode is connected to the collector of the triode, and the cathode of the constant voltage diode is connected to the base of the triode; and a heat transmitter being configured to cover said PCB assembly;

wherein each said short circuit protector is connected to each said output DC socket in parallel, said beat transmitter being configured to concentratively transfer heat of said input DC socket, output DC sockets, short circuit protectors to said thermal protector, said thermal protector being configured to cut off or resume power to all output circuits according to temperature change of the thermal protector in response to the heat transferred thereto via the heat transmitter.

9. The electrical connection box as claimed in claim 8, wherein said housing includes a base cover and a top cover.

10. The electrical connection box as claimed in claim 8, wherein a shape and size of said openings are corresponding to jacks of said output sockets.

11. The electrical connection box as claimed in claim 8, wherein said input DC socket is located on one end of said PCB board.

12. The electrical connection box as claimed in claim 8, wherein said output DC sockets are connected each other in series.

13. The electrical connection box as claimed in claim 8, wherein each said output DC socket connects an LED load unit.

14. The electrical connection box as claimed in claim 8, wherein said thermal protector is located on the other end of said PCB board corresponding to said input DC socket

15. The electrical connection box as claimed in claim 8, wherein each said short circuit protector connects an LED load unit in parallel and every pair of paralleled short circuit protector and LED load unit connects together in series.

16. The electrical connection box as claimed in claim 8, wherein a constant current output unit serves as an output of said short circuit protector.

17. The electrical connection box as claimed in claim 16, wherein said short circuit protector connects said constant current output unit via a self-recovery temperature resistance.

* * * * *